United States Patent
Simonenko et al.

(10) Patent No.: US 7,178,399 B2
(45) Date of Patent: Feb. 20, 2007

(54) HOUSING FOR MAGNETOFLUIDIC ACCELEROMETER

(75) Inventors: Dmitri Simonenko, Potomac Falls, VA (US); Anton E. Suprun, Novosibirsk (RU); Yuri I. Romanov, Novosibirsk (RU)

(73) Assignee: Innalabs Technologies, Inc., Dulles, VA (US)

(*) Notice: Subject to any disclaimer, the term of this patent is extended or adjusted under 35 U.S.C. 154(b) by 181 days.

(21) Appl. No.: 11/010,329

(22) Filed: Dec. 14, 2004

(65) Prior Publication Data

US 2005/0193801 A1 Sep. 8, 2005

Related U.S. Application Data

(63) Continuation-in-part of application No. 10/980,791, filed on Nov. 4, 2004.

(60) Provisional application No. 60/616,849, filed on Oct. 8, 2004, provisional application No. 60/614,415, filed on Sep. 30, 2004, provisional application No. 60/613,723, filed on Sep. 29, 2004, provisional application No. 60/612,227, filed on Sep. 23, 2004.

(51) Int. Cl.
*G01P 15/11* (2006.01)
*G01P 15/13* (2006.01)
*G01P 15/18* (2006.01)

(52) U.S. Cl. .................... 73/514.08; 73/514.17
(58) Field of Classification Search ................ None
See application file for complete search history.

(56) References Cited

U.S. PATENT DOCUMENTS

| | | | |
|---|---|---|---|
| 4,601,206 A | 7/1986 | Watson | |
| 4,711,125 A * | 12/1987 | Morrison | 73/178 R |
| 4,905,517 A * | 3/1990 | Crowe et al. | 73/654 |
| 4,984,463 A | 1/1991 | Idogaki et al. | |
| 5,181,181 A | 1/1993 | Glynn | |
| 5,774,113 A | 6/1998 | Barnes | |
| 5,831,553 A | 11/1998 | Lenssen et al. | |
| 5,835,077 A | 11/1998 | Dao et al. | |

(Continued)

FOREIGN PATENT DOCUMENTS

JP 62-163972 7/1987

(Continued)

OTHER PUBLICATIONS

English Translation Abstract for DE 3315958 A1, 1 page, supplied from the esp@cenet database.

(Continued)

*Primary Examiner*—Hezron Williams
*Assistant Examiner*—John C Hanley
(74) *Attorney, Agent, or Firm*—Bardmesser Law Group

(57) ABSTRACT

A housing for a magnetofluidic sensor where the sensor has a plurality of drive magnet assemblies, magnetic fluid and an inertial body. The housing has a plurality of ports for securing respective drive magnet assemblies, such that a portion of each drive magnet assembly is positioned within the housing proximate the magnetic fluid. Each drive magnet assembly includes a magnetic field source for creating a magnetic field within the magnetic fluid for acting upon the inertial body. Each drive magnet assembly also includes a sensing element for sensing movement of the inertial body within the magnetic fluid.

21 Claims, 17 Drawing Sheets

U.S. PATENT DOCUMENTS

| | | | |
|---|---|---|---|
| 5,982,169 | A | 11/1999 | Furlani et al. |
| 6,002,184 | A | 12/1999 | Delson et al. |
| 6,128,006 | A | 10/2000 | Rosenberg et al. |
| 6,154,199 | A | 11/2000 | Butler |
| 6,369,794 | B1 | 4/2002 | Sakurai et al. |
| 6,466,200 | B1 | 10/2002 | Anton et al. |
| 6,501,458 | B2 | 12/2002 | Baker et al. |
| 6,509,888 | B1 | 1/2003 | Tuovinen et al. |
| 6,731,268 | B2 | 5/2004 | Anton et al. |
| 2002/0003527 | A1 | 1/2002 | Baker et al. |
| 2002/0054011 | A1 | 5/2002 | Bruneau et al. |
| 2004/0095317 | A1 | 5/2004 | Zhang et al. |
| 2004/0140962 | A1 | 7/2004 | Wang et al. |

FOREIGN PATENT DOCUMENTS

| | | |
|---|---|---|
| JP | 02-205775 | 8/1990 |
| JP | 04-344467 | 12/1992 |
| JP | 06-213921 | 8/1994 |

OTHER PUBLICATIONS

English Translation Abstract for RU 2201618 C2, 1 page.
English Translation Abstract for RU 2173882 C1, 1 page.
English Translation Abstract for RU 2166203 C1, 1 page.
English Translation Abstract for RU 2168201 C1, 1 page.
Computer Internet Website, Magellan 3D Controller (also known as Space Mouse), by Logicad, a Logitech Company, address "http://www.qualixdirect.com/html/magellan.html", 2 pages.
Computer Internet Website, "Logitech 3D Mouse Logitech Head Tracker", by Fakespace, Inc., address "http://www.qualixdirect.com/html3d_mouse_and_head_tracker.html", 2 pages.
Computer Internet Website, "The Spaceball 3D Controller", by Spacetec IMC Corporation, address "http://www.qualixdirect.com/html/spaceball.html", 3 pages.
"IEEE Recommended Practice for Precision Centrifuge Testing of Linear Accelerometers", IEEE Standards 836-2001, The Institute of Electrical and Electronics Engineers, Inc., Nov. 7, 2001, pp. i-86.
"IEEE Specification Format Guide and Test Procedure for Two-Degree-of-Freedom Dynamically Tuned Gyros", ANS/IEEE Std 813-1988, The Institute of Electrical and Electronic Engineers, Inc., 1989, pp. i-91.
Bashtovoi, V.G. et al. "Introduction to Thermomechanics of Magnetic Liquids", High Temperature Institute of the Academy of Sciences of the USSR, Moscow, 1985 (partial translation of p. 13).
"IEEE Standard Specification Format Guide and Test Procedure for Nongyroscopic Inertial Angular Sensors: Jerk, Acceleration, Velocity, and Displacement", IEEE Std 671-1985 (R2003), The Institute of Electrical and Electronics Engineers, Inc., 1985, pp. iii-69.

* cited by examiner

HOUSING FOR MAGNETOFLUIDIC ACCELEROMETER

CROSS-REFERENCE TO RELATED APPLICATIONS

This application is a continuation-in-part of U.S. application Ser. No. 10/980,791, entitled MAGNETOFLUIDIC ACCELEROMETER WITH ACTIVE SUSPENSION, filed Nov. 4, 2004; and claims the benefit of U.S. Provisional Patent Application No. 60/616,849, entitled MAGNETOFLUIDIC ACCELEROMETER AND USE OF MAGNETOFLUIDICS FOR OPTICAL COMPONENT JITTER COMPENSATION, Inventors: SUPRUN et al., filed: Oct. 8, 2004; U.S. Provisional Patent Application No. 60/614,415, entitled METHOD OF CALCULATING LINEAR AND ANGULAR ACCELERATION IN A MAGNETOFLUIDIC ACCELEROMETER WITH AN INERTIAL BODY, Inventors: ROMANOV et al., filed: Sep. 30, 2004; U.S. Provisional Patent Application No. 60/613,723, entitled IMPROVED ACCELEROMETER USING MAGNETOFLUIDIC EFFECT, Inventors: SIMONENKO et al., filed: Sep. 29, 2004; and U.S. Provisional Patent Application No. 60/612,227, entitled METHOD OF SUPPRESSION OF ZERO BIAS DRIFT IN ACCELERATION SENSOR, Inventor: Yuri I. ROMANOV, filed: Sep. 23, 2004; which are all incorporated by reference herein in their entirety.

This application is related to U.S. patent application Ser. No. 10/836,624, filed May 3, 2004; U.S. patent application Ser. No. 10/836,186, filed May 3, 2004; U.S. patent application Ser. No. 10/422,170, filed May 21, 2003; U.S. patent application Ser. No. 10/209,197, filed Aug. 1, 2002, now U.S. Pat. No. 6,731,268; U.S. patent application Ser. No. 09/511,831, filed Feb. 24, 2000, now U.S. Pat. No. 6,466,200; and Russian patent application No. 99122838, filed Nov. 3, 1999, which are all incorporated by reference herein in their entirety.

BACKGROUND OF THE INVENTION

1. Field of the Invention

The present invention is related a housing for a magnetofluidic acceleration sensors.

2. Background Art

Magnetofluidic accelerometers are described in, e.g., U.S. patent application Ser. No. 10/836,624, filed May 3, 2004, U.S. patent application Ser. No. 10/836,186, filed May 3, 2004, U.S. patent application Ser. No. 10/422,170, filed May 21, 2003, U.S. patent application Ser. No. 10/209,197, filed Aug. 1, 2002 (now U.S. Pat. No. 6,731,268), U.S. patent application Ser. No. 09/511,831, filed Feb. 24, 2000 (now U.S. Pat. No. 6,466,200), and Russian patent application No. 99122838, filed Nov. 3, 1999. These accelerometers utilize magnetofluidic principles and an inertial body suspended in a magnetic fluid, to measure acceleration. Such an accelerometer often includes a sensor casing (sensor housing, or "vessel"), which is filled with magnetic fluid. An inertial body ("inertial object") is suspended in the magnetic fluid. The accelerometer usually includes a number of drive coils (power coils) generating a magnetic field in the magnetic fluid, and a number of measuring coils to detect changes in the magnetic field due to relative motion of the inertial body.

BRIEF SUMMARY OF THE INVENTION

The present invention relates to housings for magnetofluidic acceleration sensors that substantially obviates one or more of the disadvantages of the related art.

In an embodiment of the present invention, a sensor includes a housing that encloses an inertial body and holds a plurality of magnetic field sources. The magnetic field sources may include magnets, electromagnets or a combination of the two. The sensor housing also contains magnetic fluid situated substantially between the magnetic field sources and the inertial body. The magnetic field sources generate a magnetic field within the magnetic fluid to hold the inertial body in suspension therein. Pairs of sensing coils (or other position sensors) are located about the housing in order to sense a change in magnetic flux density within the sensor housing due to movement of the inertial body within the magnetic fluid.

Various embodiments of the sensor housing accommodate the magnetic field sources being positioned substantially or partially within an interior of the sensor housing. In an embodiment of the sensor housing, the sensing coils and the magnetic field sources may be mounted in a plurality of assembly casings that are respectively coupled to the sensor housing. In one embodiment, each of the assembly casing and sensing coils includes a leading surface in a common plane. The leading surfaces of the sensing coils are hermetically sealed by a thin film to prevent leakage of the magnetic fluid into the assembly casing. As such, the magnetic fluid is retained within an interior of the housing and displacement of the inertial body is substantially confined to a "working" space of the sensor housing defined by the leading surfaces of the assembly casing.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to embodiments of the present invention, examples of which are illustrated in the accompanying drawings.

Figure 1:
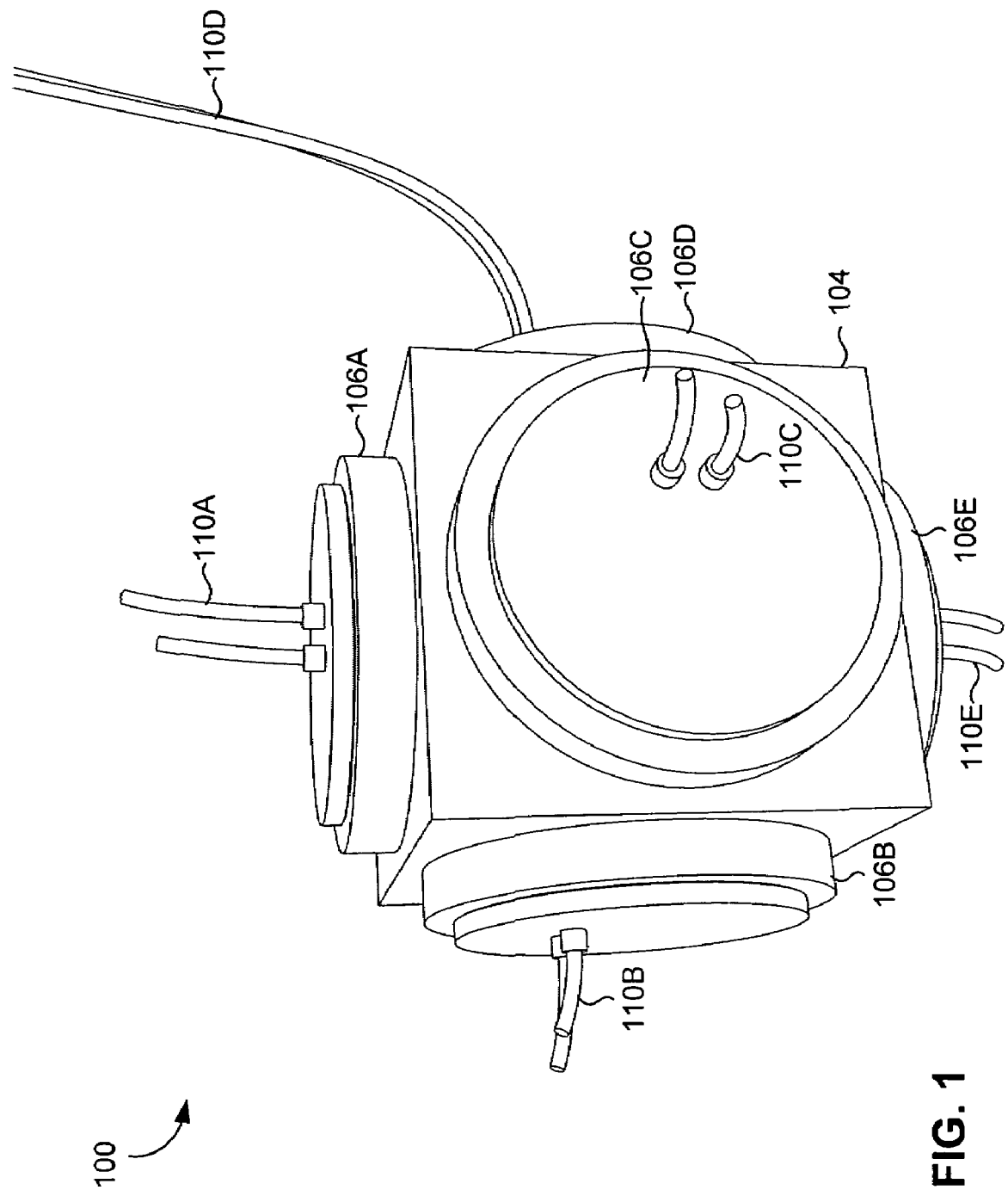
FIG. 1 illustrates an isometric view of an assembled magnetofluidic acceleration sensor according to an embodiment of the present invention.

FIG. 1 illustrates an embodiment of a magnetofluidic acceleration sensor 102 according to the present invention. The general principles of operation of the magnetofluidic sensor are described in U.S. Pat. No. 6,466,200, which is incorporated herein by reference. The sensor's behavior is generally described by a set of non-linear partial differential equations, see U.S. Provisional Patent Application No. 60/614,415, entitled METHOD OF CALCULATING LINEAR AND ANGULAR ACCELERATION IN A MAGNETOFLUIDIC ACCELEROMETER WITH AN INERTIAL BODY, Inventors: ROMANOV et al., Filed: Sep. 30, 2004, to which this application claims benefit under 35 U.S.C. § 119.

Sensor 102, shown in FIG. 1 in assembled form, includes a housing 104, a number of drive magnet assemblies 106A–106E, each of which is connected to a power source (not shown) using corresponding leads 110A–110E. Five drive magnet assemblies 106A–106E are shown in FIG. 1, with a sixth drive magnet assembly 106F being hidden in this view but shown in FIG. 3. However, in further embodiments, fewer or more than six drive magnet assemblies may be incorporated into the sensor depending on the application in which the sensor is to be used. In one embodiment, housing 104 is formed from a suitable plastic by an injection molding process. As such, housing 104 may be of a single or multi-part construction.

Figure 2:
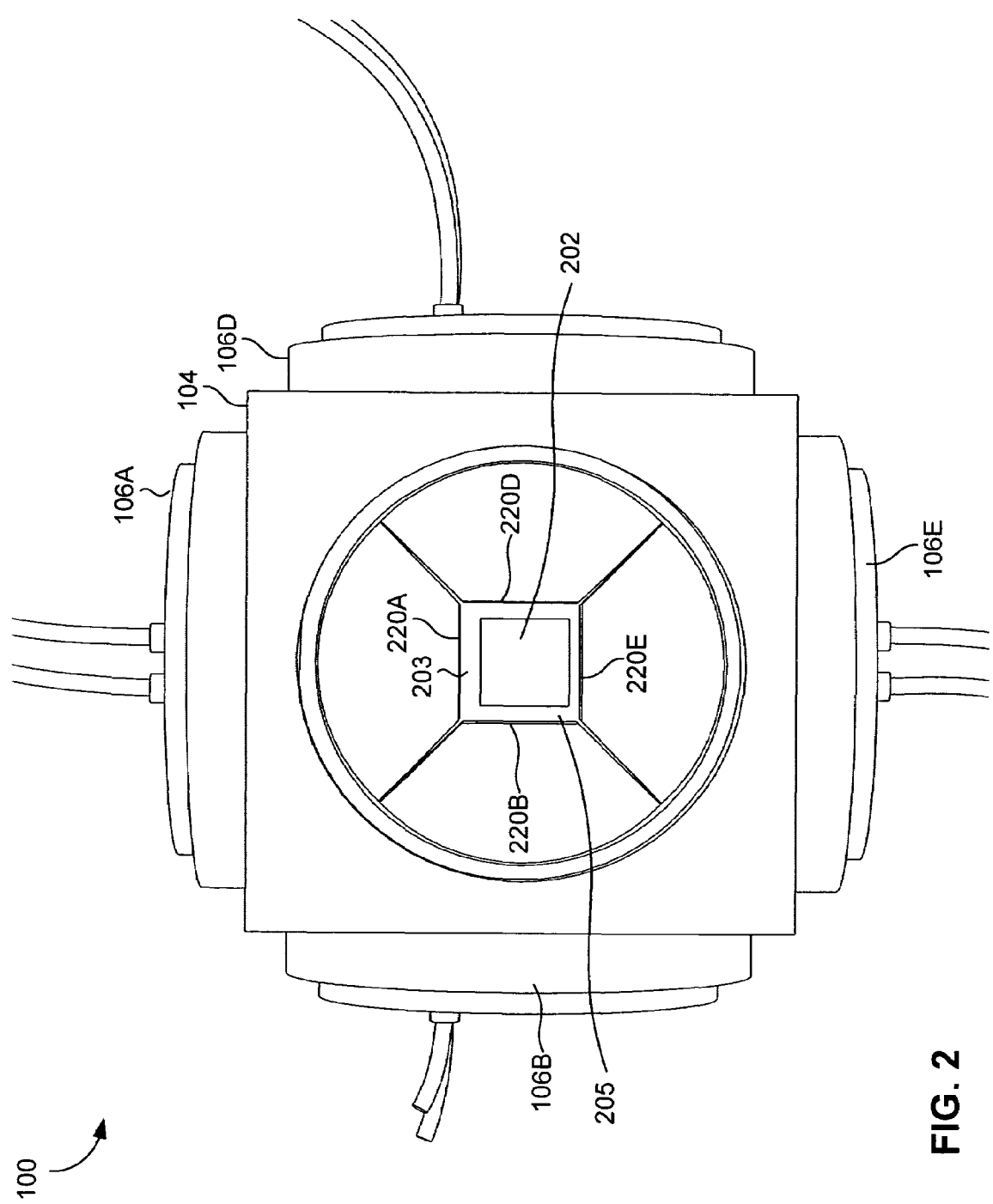
FIG. 2 illustrates a side view of the sensor of FIG. 1 with a drive magnet assembly removed.

FIG. 2 illustrates sensor 102 of FIG. 1, with drive magnet assembly 106C removed. With drive magnet assembly 106C removed, an inertial body 202 is visible in a working space 205 of housing 104, the parameters of which are more fully detailed below. During operation, inertial body 202 is located at an approximate geometric center of housing 104 as shown. A magnetic fluid 203 fills or partially fills a remainder of the available volume of housing 104. For example, magnetic fluid 203 may include, in a kerosene base liquid, metallic particles, such as cobalt, gadolinium, nickel, dysprosium and iron, their oxides, e.g., $Fe_3O_4$, $FeO_2$, $Fe_2O_3$, as well as such magnetic compounds as manganese zinc ferrite ($Zn_xMn_{1-x}Fe_2O_4$), cobalt ferrites, or other ferromagnetic alloys, oxides and ferrites. As an alternative to kerosene, water or certain oils may be used as the base liquid.

Figure 3:
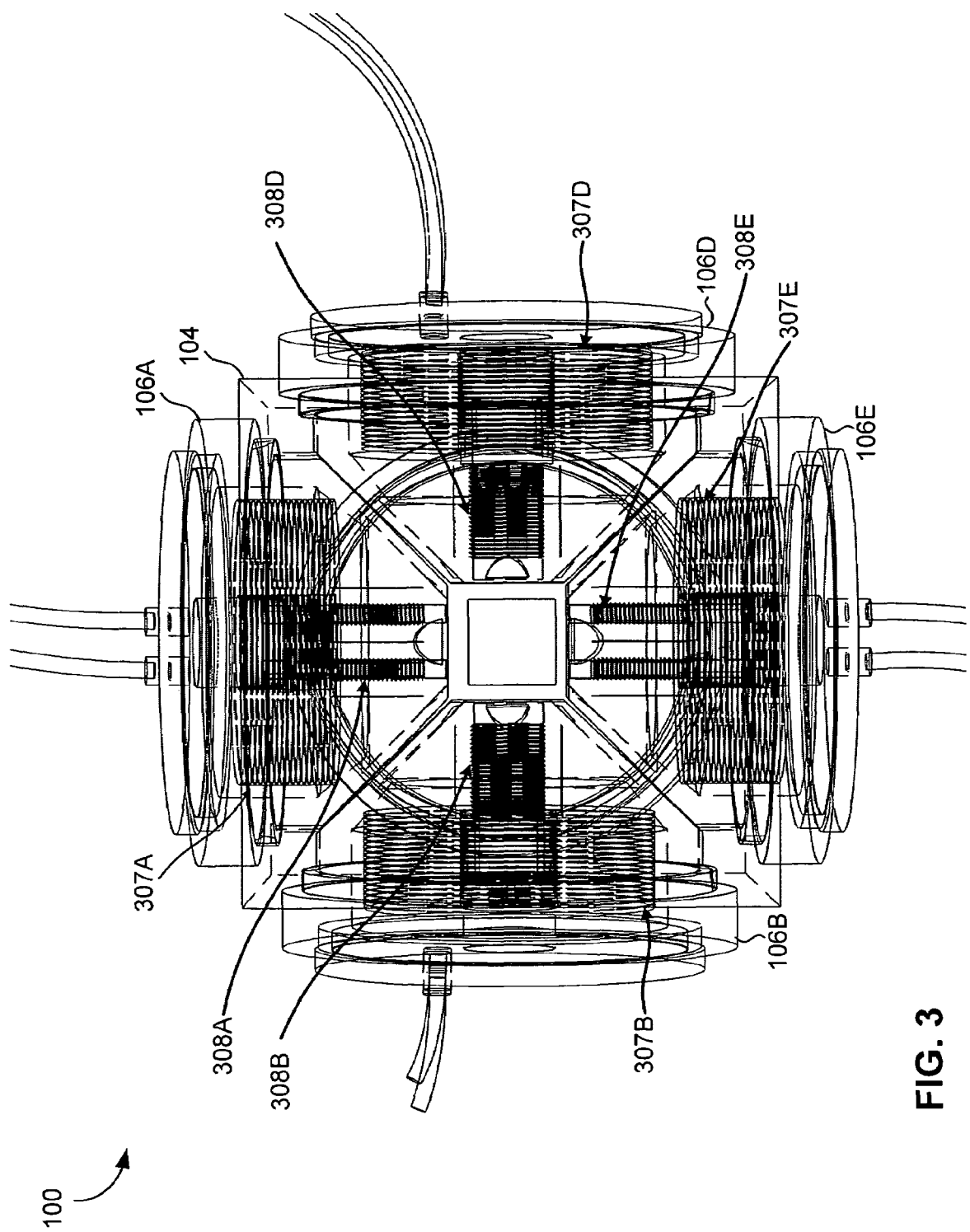
FIG. 3 illustrates a partial cutaway view of the sensor shown in FIG. 2.

FIG. 3 illustrates a partial cutaway view of sensor 102 of FIG. 2 showing drive magnet assemblies 106A, 106B, 106D and 106E having an arrangement of respective drive magnets 307A, 307B, 307D and 307E and pairs of sensing coils 308A, 308B, 308D and 308E. It should be understood that in the embodiment of FIG. 3, each drive magnet assembly 106A–106F of sensor 102 has a pair of sensing coils and a drive magnet, as representatively illustrated in FIG. 3 by pairs of sensing coils 308A, 308B, 308D, and 308E and drive magnet assemblies 106A, 106B, 106D and 106E.

Drive magnets may be magnets, electromagnets or a combination thereof, and alternatively may be referred to as suspension magnets, power magnets, power coils, or suspension coils (if electromagnets are used).

Sensing coils may also be referred to as sensing magnets, or measuring coils. In addition or alternatively to a pair of sensing coils (i.e., inductive sensors), Hall sensors, laser or LED sensors, electrostatic sensors, acoustic sensors, and optical sensors may also be used to detect the position of inertial body 202.

In one embodiment, in order to measure both linear and angular acceleration, a pair of sensing coils is positioned on each side of housing 104. In another embodiment, it is possible to use a single sensing coil placed off-center on each side of housing 104, but in this case, determining angular acceleration requires a more complex mathematical analysis.

Figure 4:
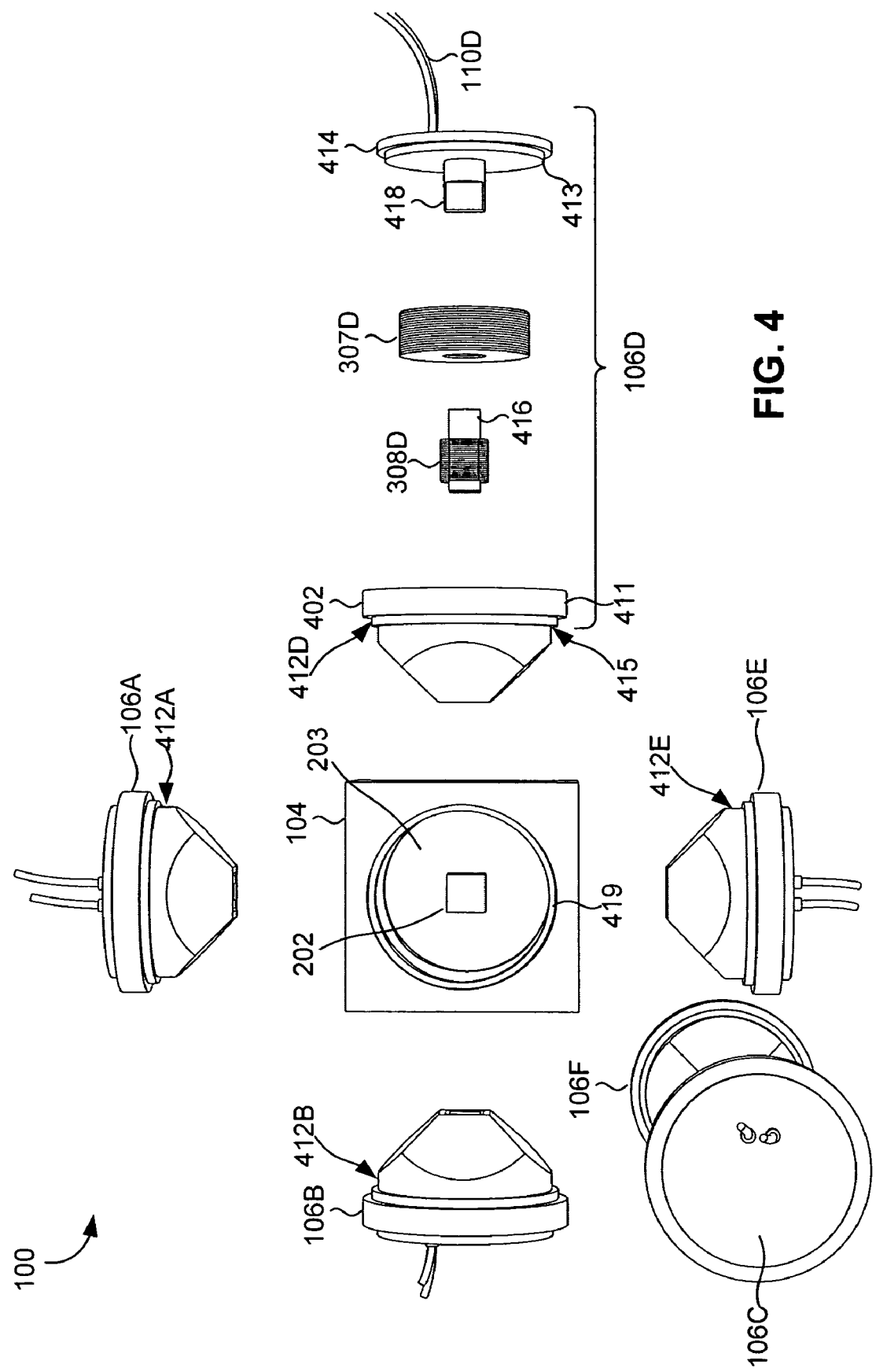
FIG. 4 illustrates an exploded side view of the sensor of FIG. 1.
Figure 5:
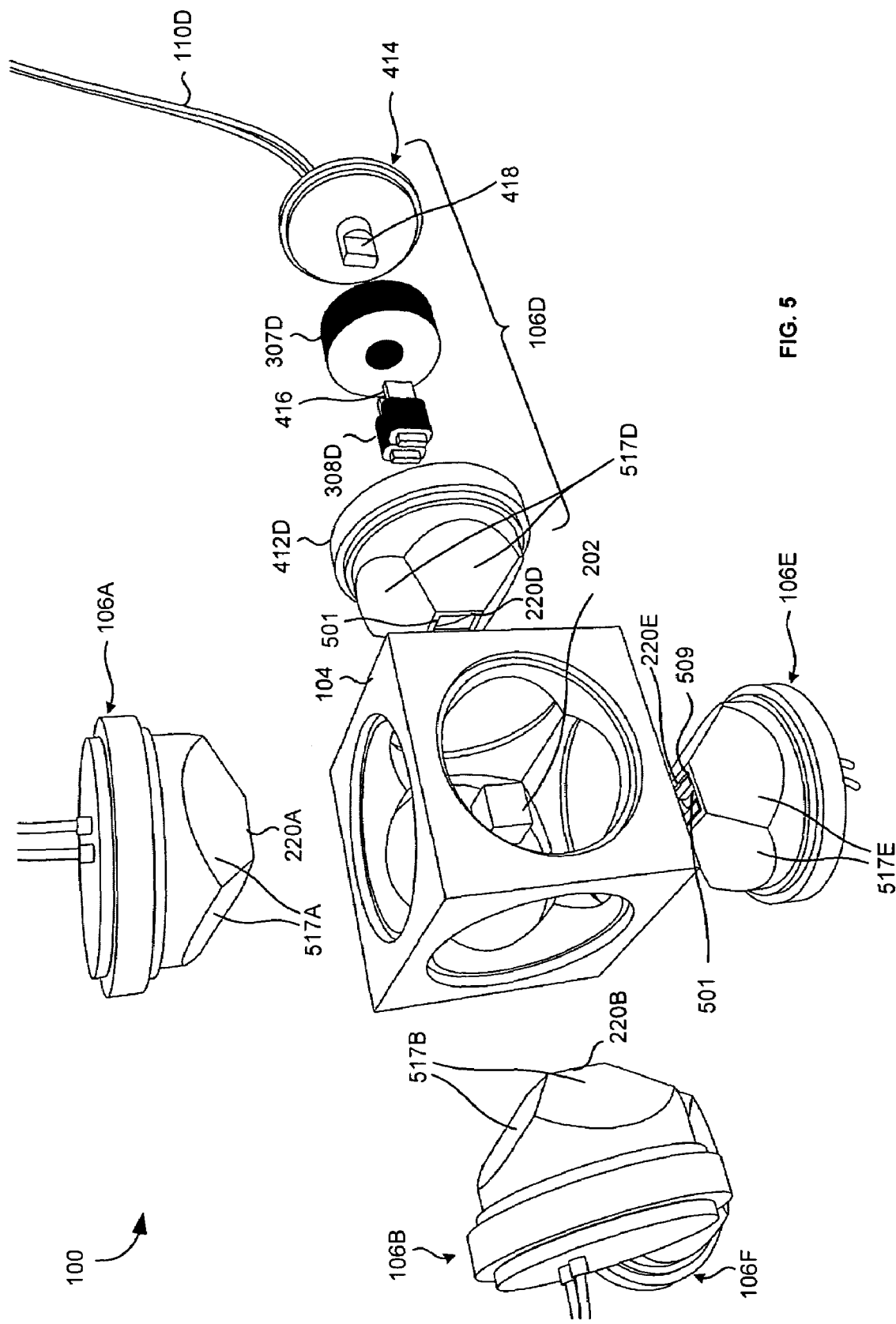
FIG. 5 illustrates an isometric view of the sensor of FIG. 4.

FIGS. 4 and 5 illustrate various components of sensor 102 of FIG. 1 from two different angles. Each figure includes an exploded view of drive magnet assembly 106D. As shown in the figures, drive magnet assembly 106D includes an assembly casing 412D, a rear cap 414, drive magnet 307D, a pair of sensing coils 308D, and a drive magnet core 418. Each sensing coil 308D is wound about a respective sensing core 416. In one embodiment the manufacturing process is simplified by allowing for each sensing coil 308D to be independently wound around its respective sensing core 416. Sensing cores 416 along with sensing coils 308D are then attached (glued) to drive magnet core 418 on which drive magnet (i.e., power coil) 307D is subsequently wound to thereby create a subassembly. The subassembly is then placed inside assembly casing 412D which is finally secured to rear cap 414 to form drive magnet assembly 106D.

Figure 13:
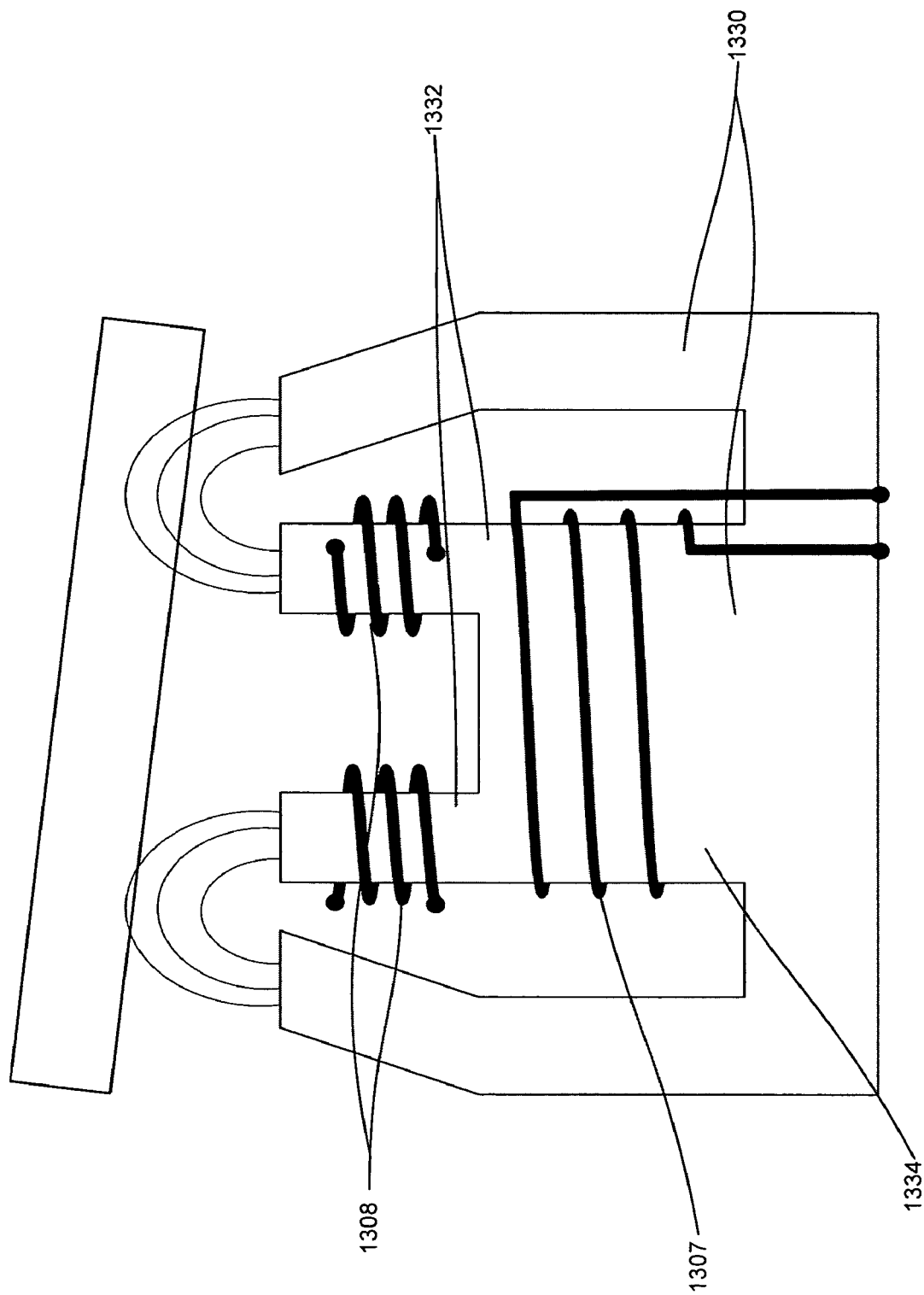
FIG. 13 illustrates an embodiment of a common transformer core for use in the present invention.

As illustrated in FIG. 4, drive magnet 307D is wound about drive magnet core 418 that is securably attached to or made integral with rear cap 414. Assembly casing 412D is securable to rear cap 414 to enclose drive magnet 307D and sensing coils 308D therein. Drive magnet 307D may be operationally connected by core portion 418 to a power source (not shown) via leads 110D. Similarly, sensing coils 308D maybe operationally connected to a device for receiving output from the sensor (not shown) via core portion 416. In an alternative embodiment as shown in FIG. 13, cores 416 and 418 may be replaced by a single or common transformer core 1330. In the embodiment of FIG. 13, each sensing coil 1308 is wound around a respective fork tine 1332 of common transformer core 1330, whereas a drive magnet 1307 is wound around a base 1334 of common transformer core 1330.

FIG. 5 is an isometric view of sensor 102 of FIG. 4. In this embodiment of the present invention, assembly casing 412D includes an aperture 501 for accommodating positioning of leading surfaces 509 of sensing cores 416 in a common plane with leading surface 220D of assembly casing 412D. In one embodiment, leading surfaces 509 of sensing cores 416 are hermetically sealed by a thin film (not shown) so that the sensing coils do not make contact with magnetic fluid 203. Additionally, the thin film prevents the magnetic fluid from leaking into assembly casing 412D. In one embodiment, the thin film may be made from a non-magnetic non-conducting material, such as TEFLON or polyethylene teraphthalate (PET or DACRON). In a further embodiment, a sealant that adheres to the assembly casing and sensing coil cores may be used to prevent the magnetic fluid from migrating into the assembly casing 412D.

In the embodiment of FIGS. 4 and 5, assembly casing 412D includes a rim 411 that has an inner diameter sized to fit about a shoulder 413 of rear cap 414. In this manner, the securing arrangement between assembly casing 412D and cap 414 may be a snap, friction or interference fit that can also include an adhesive or sealing means. In an alternative embodiment, assembly casing 412D and cap 414 may have a threaded connection. Assembly casing 412D also includes a shoulder 415 that is receivable within and dockable with a port 419 of sensor housing 104. In this manner, the securing arrangement between assembly casing 412D and sensor housing 104 may be a snap, friction or interference fit that may also include an adhesive or sealing means therebetween.

In the embodiment of FIGS. 1–5, assembly casings 412A, 412B, 412D, and 412E of drive magnet assemblies 106A, 106B, 106D and 106E each respectively includes four inclined faces 517A, 517B, 517D and 517E. It should be understood that drive magnet assemblies 106C and 106F that are not fully shown also include four such inclined faces. In the sensor housing shown in the embodiment of FIGS. 1–5, the assembly casings are of a "pyramidal" shape to maximize an assembly casing radius adjacent the drive magnet coil winding. In such an arrangement, dissipation fluxes inside the assembly casings that are not useful during operation of the sensor are minimized because a ratio between the assembly casing radius adjacent the drive coil to a radius of the core is maximized.

When drive magnet assemblies 106A–106F are docked within a respective port 419 of sensor housing 104, each inclined face of a first drive magnet assembly casing aligns with an adjacent inclined face of each of four proximate drive magnet assembly casings in an interior of housing 104. The alignment of casing surfaces is best illustrated in the interior view of sensor housing 104 shown in FIG. 2. As shown in FIG. 2, leading surfaces 220A, 220B, 220D and 220E of drive magnet assemblies 106A, 106B, 106D and 106E, along with leading surfaces of drive magnet assemblies 106C and 106F (not shown), form a working space 205 in which inertial body 202 is substantially contained.

The magnetic fields that are created by each drive magnet assembly 106A–106F are used cooperatively to suspend inertial body 202 within magnetic fluid 203 at an equilibrium point within working space 205 that is close to a geometric center of sensor housing 104. Upon movement of inertial body 202 and the concurrent displacement of magnetic fluid 203, sensing coils of drive magnet assemblies 106A–106F measure changes in the magnetic field within housing 104. Magnetic fluid 203, acting as an elastic body, attempts to return within working space 205 to locations where the magnetic field is strongest. This results in a repulsive force against inertial body 202.

Inertial body 202 may be made either of a non-magnetic or of a partly (weakly) magnetic (e.g., substantially less magnetic than the magnetic fluid 203) material.

Figure 6:
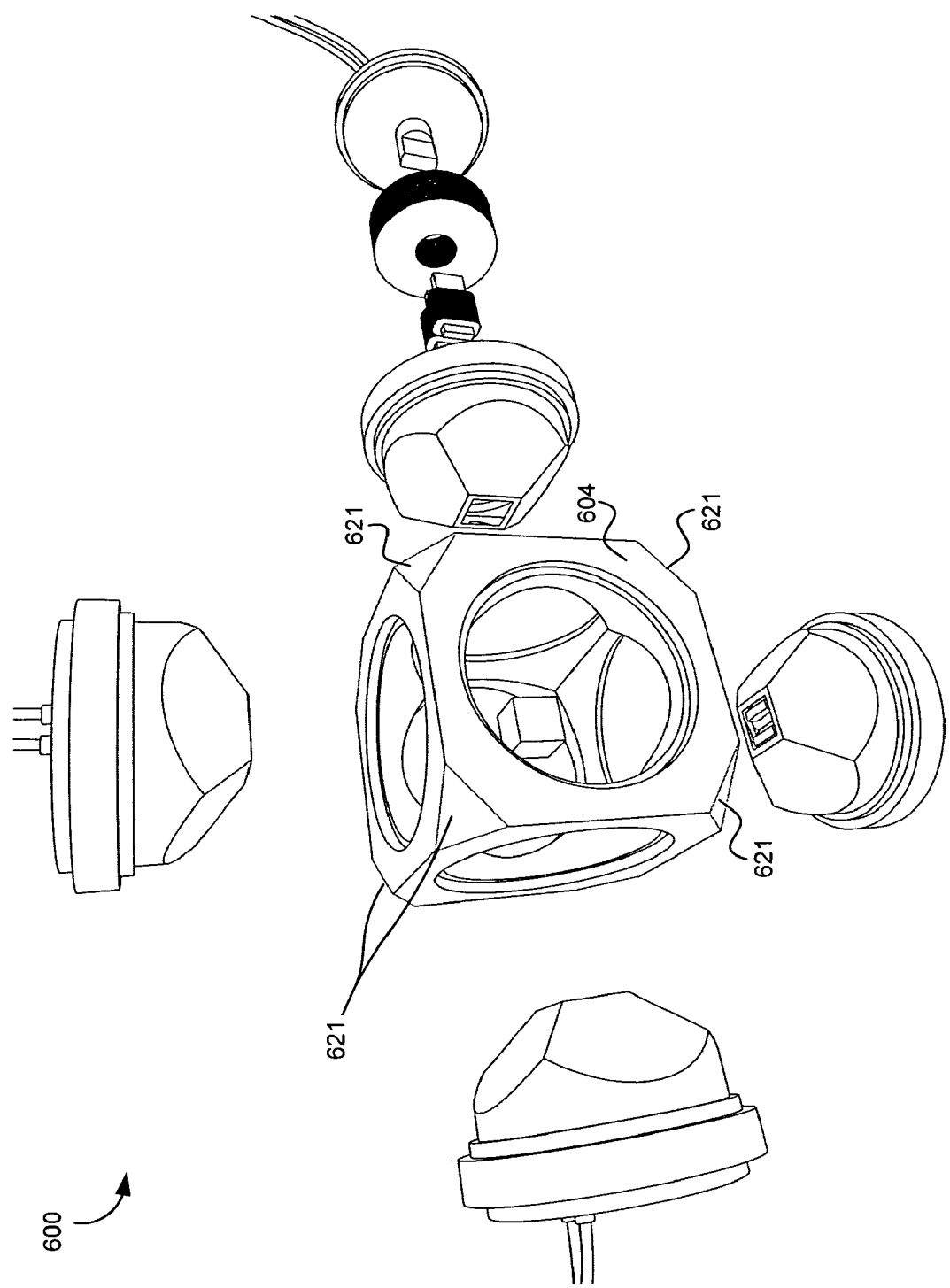
FIG. 6 illustrates another embodiment of a sensor according to the present invention.

Although the sensor housing shown and described above is cubical, it will be appreciated that the sensor housing need not be cubical, but can take other forms to accommodate: a greater or lesser volume of magnetic fluid; a decrease or increase in the overall size of the magnetofluidic acceleration sensor; variously shaped inertial bodies; and/or a greater or lesser number of magnetic field sources and/or sensing mechanism. For example, a conformal housing 604 of a sensor 600 has beveled corners 621, as illustrated in FIG. 6, to reduce an interior area of the sensor, as well as the external dimensions. Moreover, in one embodiment at least one beveled corner 621 may include a small aperture through which the assembled sensor is filled with magnetic fluid. The advantage of this approach is that less magnetic fluid needs to be used, which results in a more stable sensor, and a lower cost (since the magnetic fluid is a relatively expensive component). In this case, there is a greater damping effect by the fluid, which means that the bandwidth of the sensor decreases. It should also be noted that there are many applications where a lower bandwidth is actually desirable.

Figure 7:
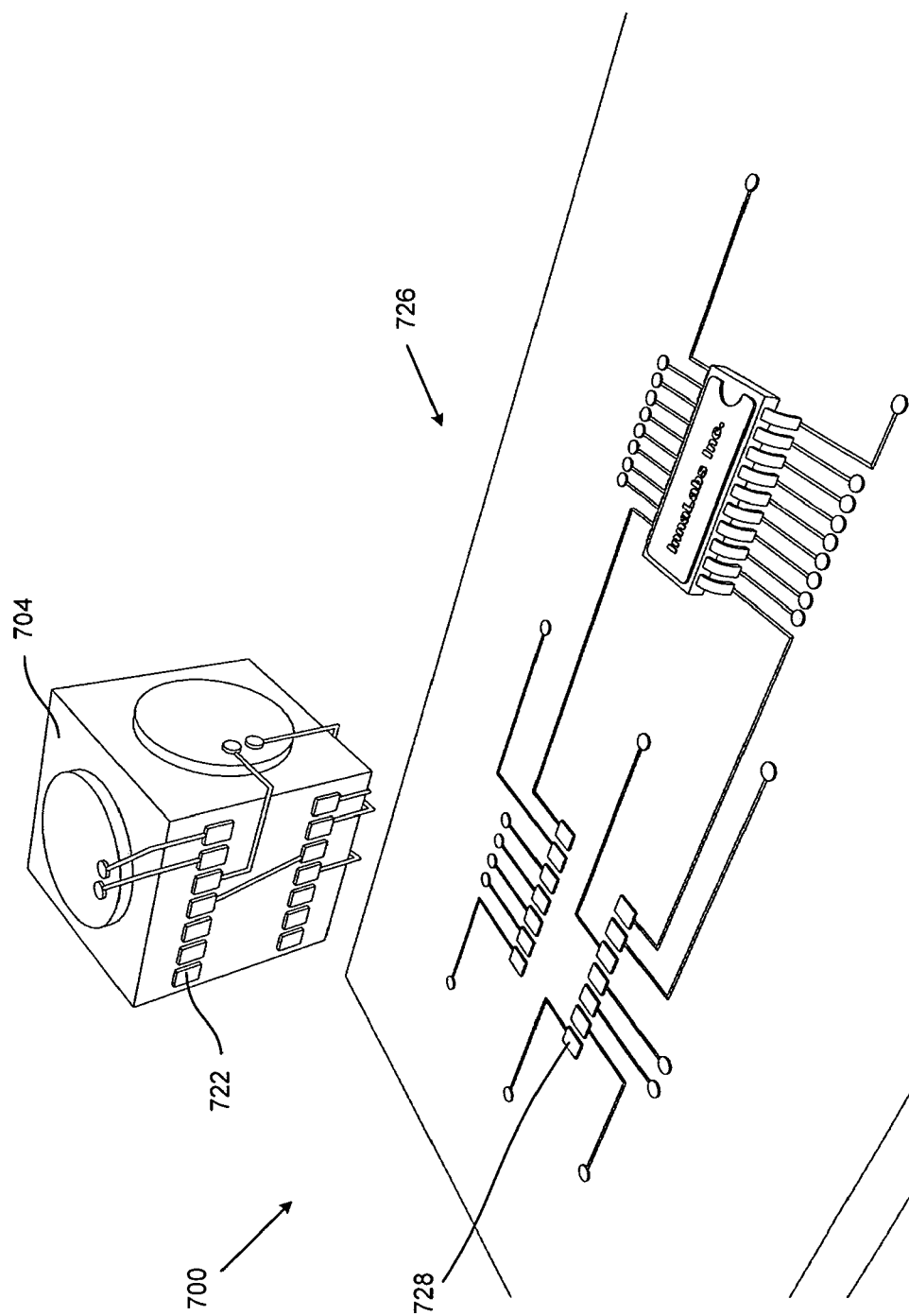
FIG. 7 illustrates a sensor housing according to another embodiment of the present invention.
Figure 8:
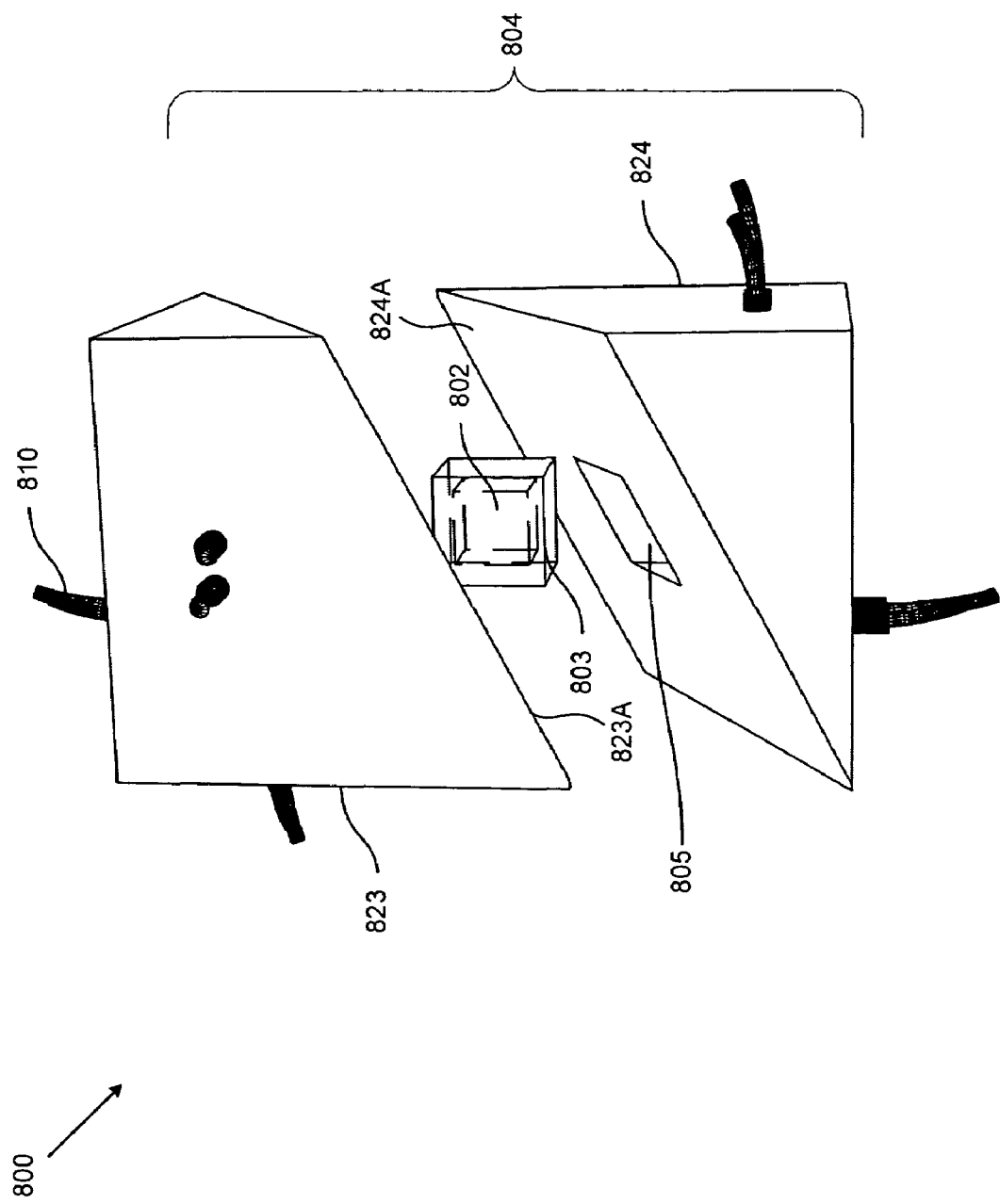
FIGS. 8, 9A, 9B and 10 illustrate a clam-shell type housing for a sensor according to another embodiment of the present invention.
Figure 9A:
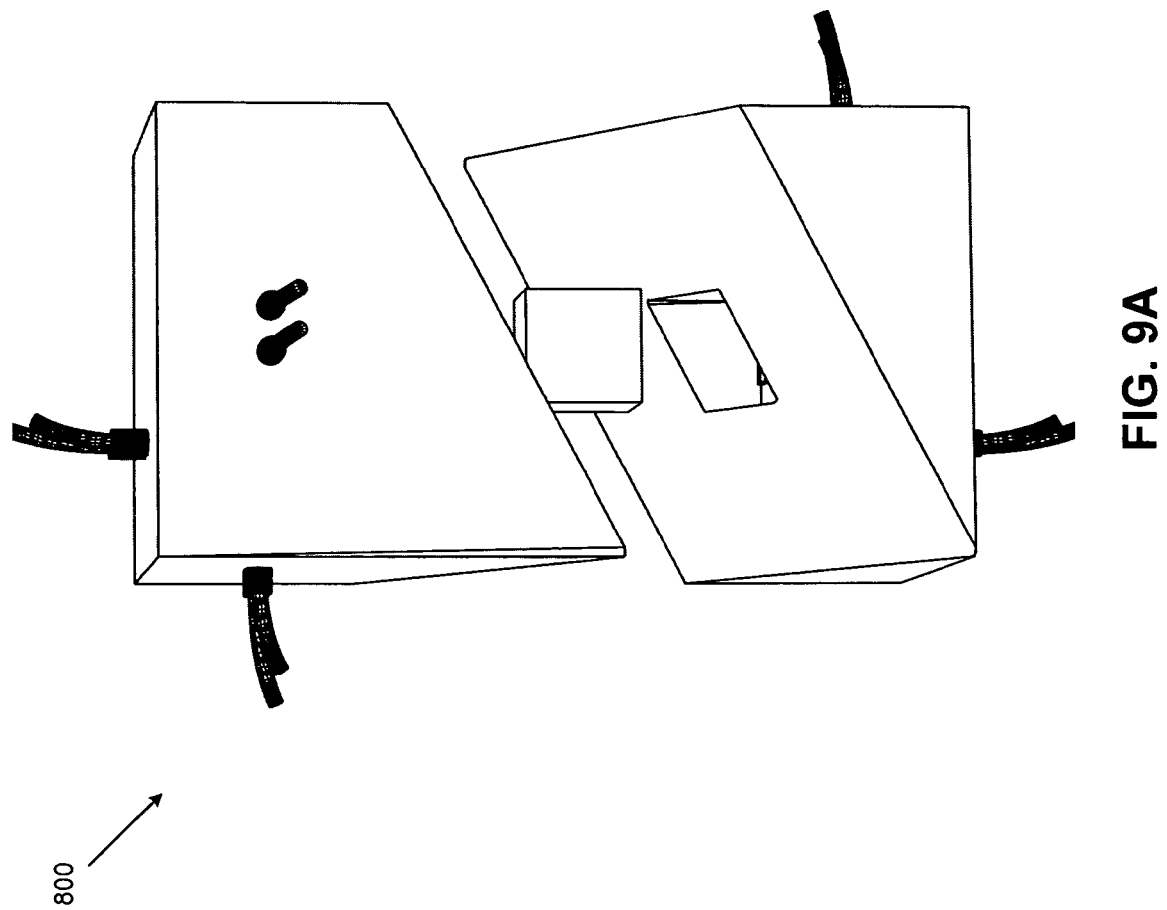
Figure 9B:
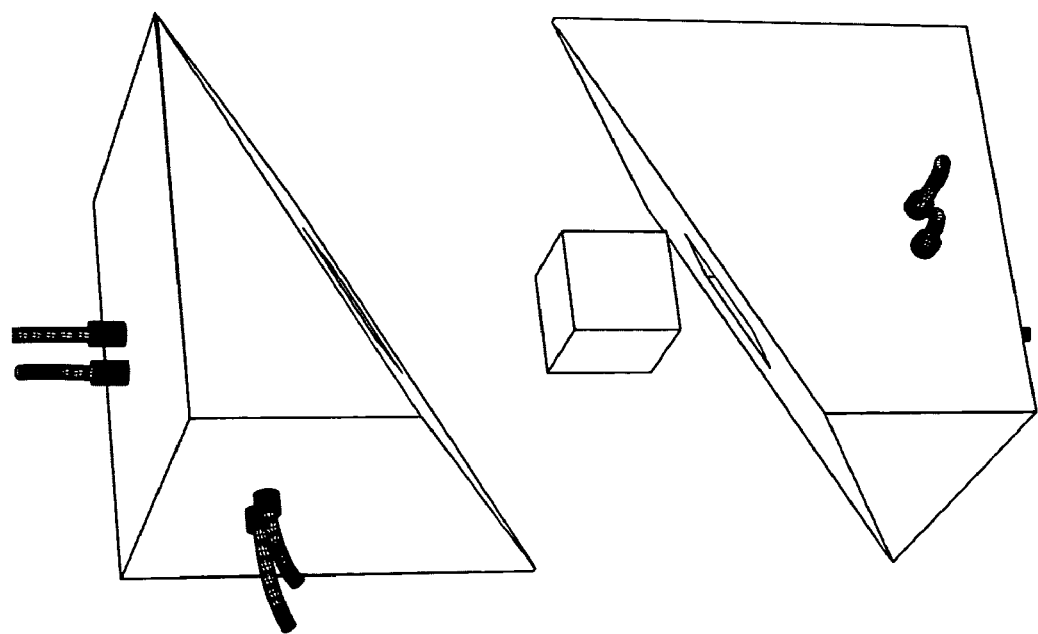
Figure 10:
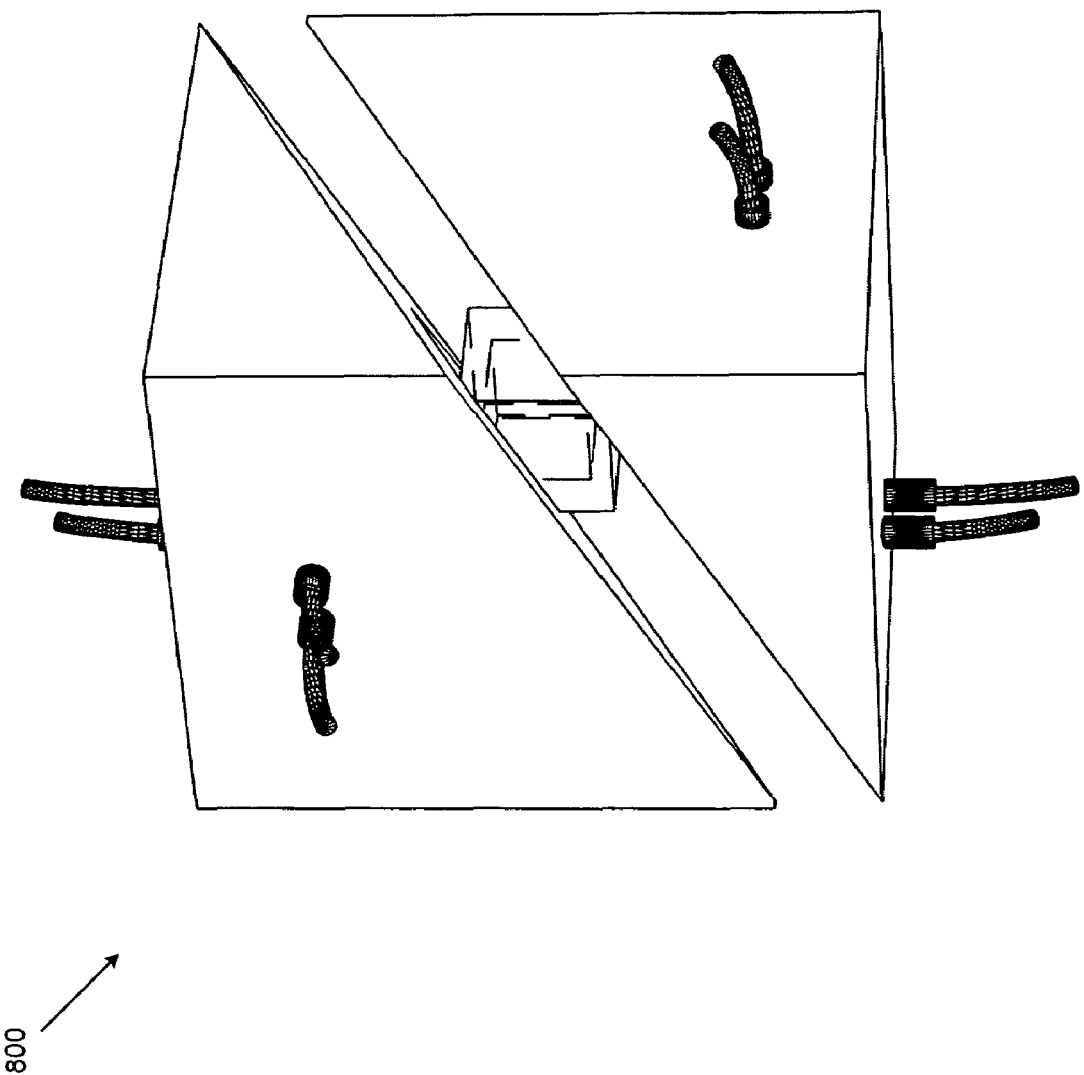

Further, a sensor housing according to an embodiment of the present invention may have a side dimension of a few millimeters or less. In an alternative embodiment shown in FIG. 7, a sensor 700 with minimal side dimensions is shown that is adapted for direct mounting on a Printed Circuit Board (PCB). Sensor 700 includes contact pads 722 incorporated onto a side surface of a housing 704 for mounting sensor 700 onto PCB 726 that includes matching contact pads 728.

Although the embodiments discussed above illustrate a housing with separate drive magnet assemblies secured thereto, it is within the purview of the present invention to construct a combination housing/drive magnet assembly of fewer components that are sealingly secured together for ease of variation in design. For example, FIGS. 8, 9A, 9B and 10 illustrate a sensor 800 having a combination housing/drive magnet assembly 804 that includes a first portion 823 and a second portion 825 which form a cube or parallelepiped when joined along corresponding joining surfaces 823A and 824A. In this embodiment, an inertial body 802 with representative magnetic fluid 803 are enclosed within a working space 805 that is partially formed into each joining surface 823A and 824A. Leads 810, shown exiting first and second housing portions 823, 824, are connected to various drive magnets and sensing elements within and/or made integral with housing/drive magnet assembly 804.

Figure 11:
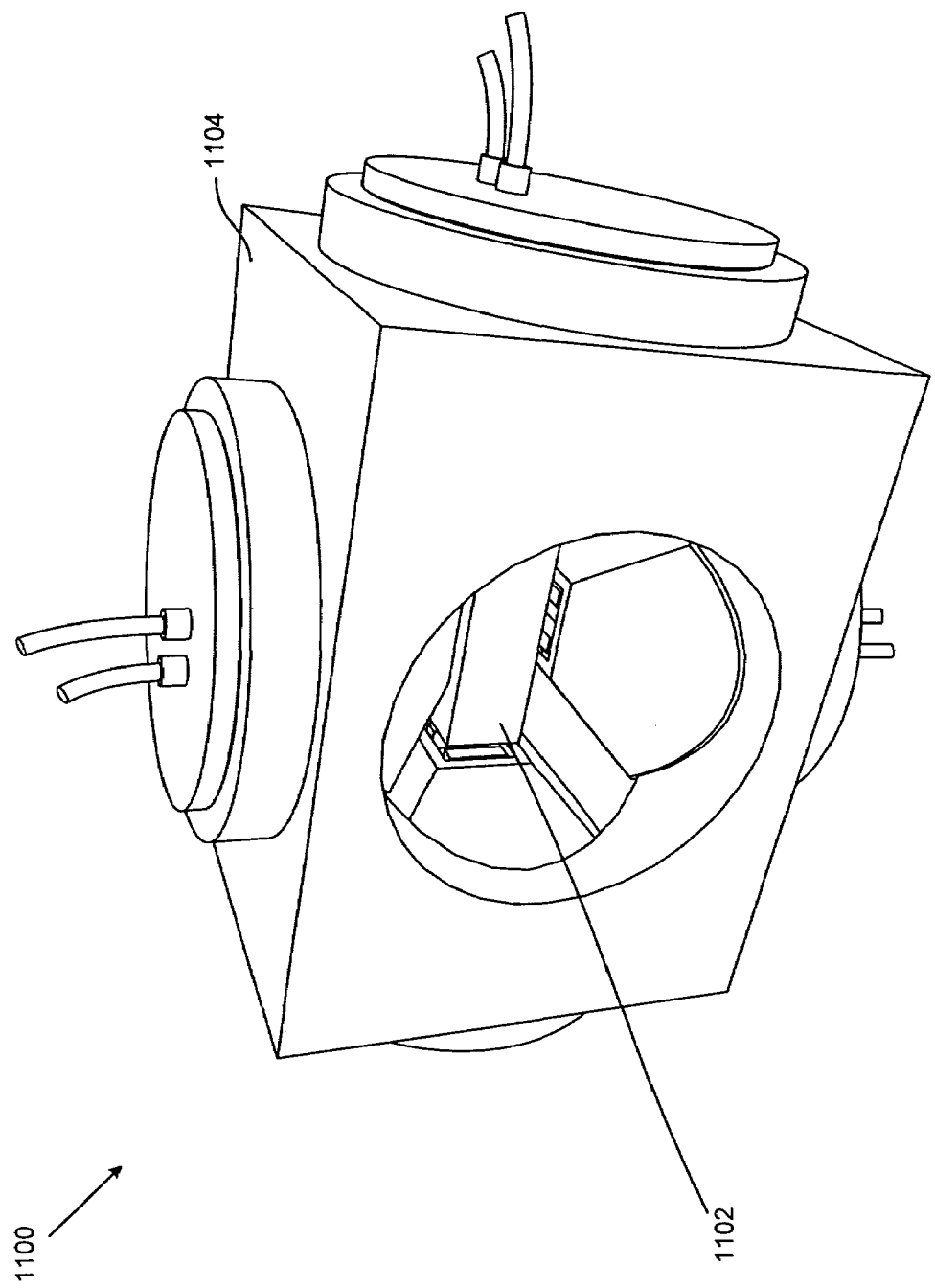
FIGS. 11–12 illustrate a housing for a sensor according to another embodiment of the present invention.
Figure 12:
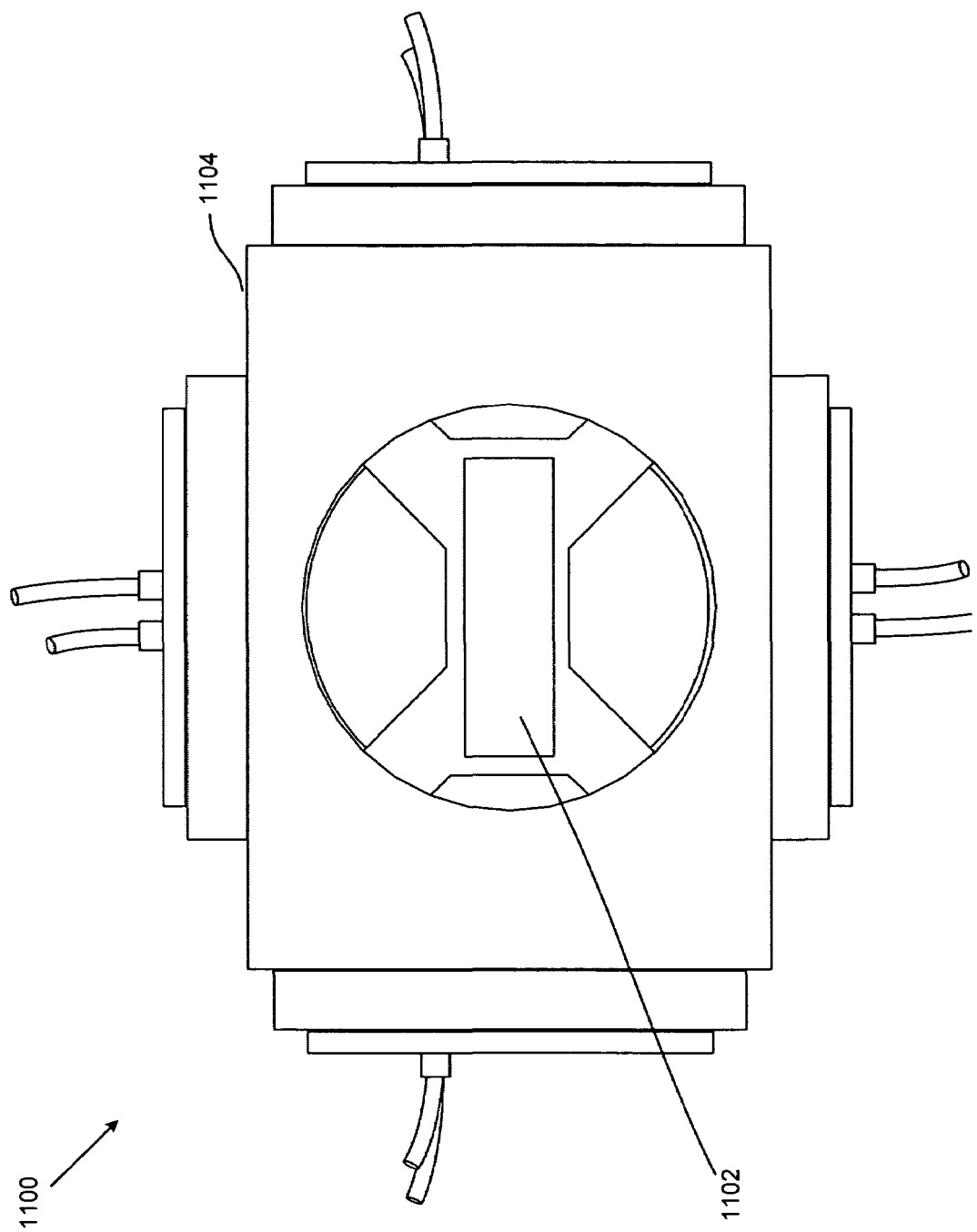

In another embodiment shown in FIGS. 11–12, a sensor 1100 includes a housing 1104 of a rectangular polyhedron shape that houses an inertial body 1102, also shaped as a rectangular polyhedron.

Figure 14:
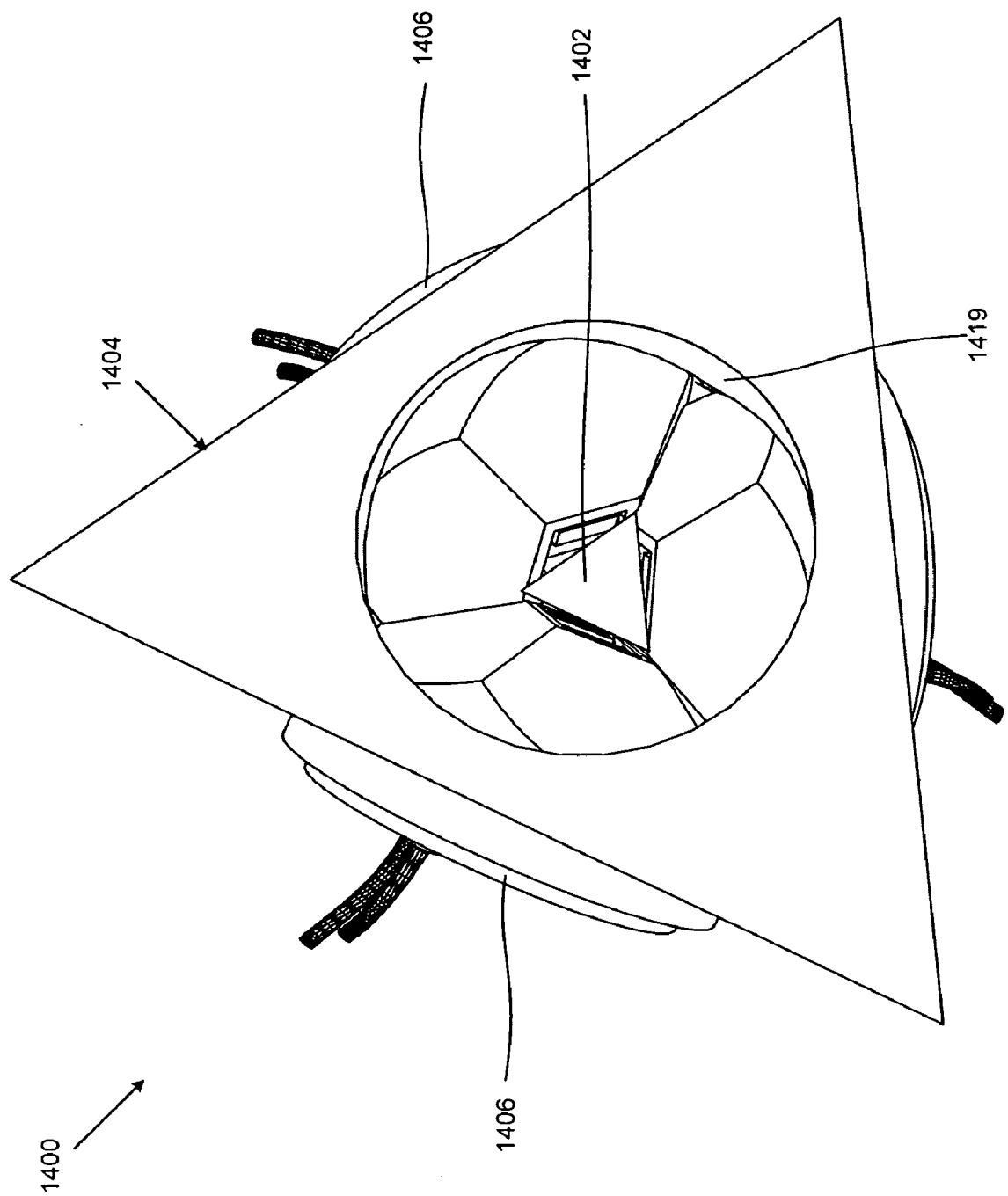
FIGS. 14–16 illustrate a housing for a sensor according to another embodiment of the present invention.
Figure 15:
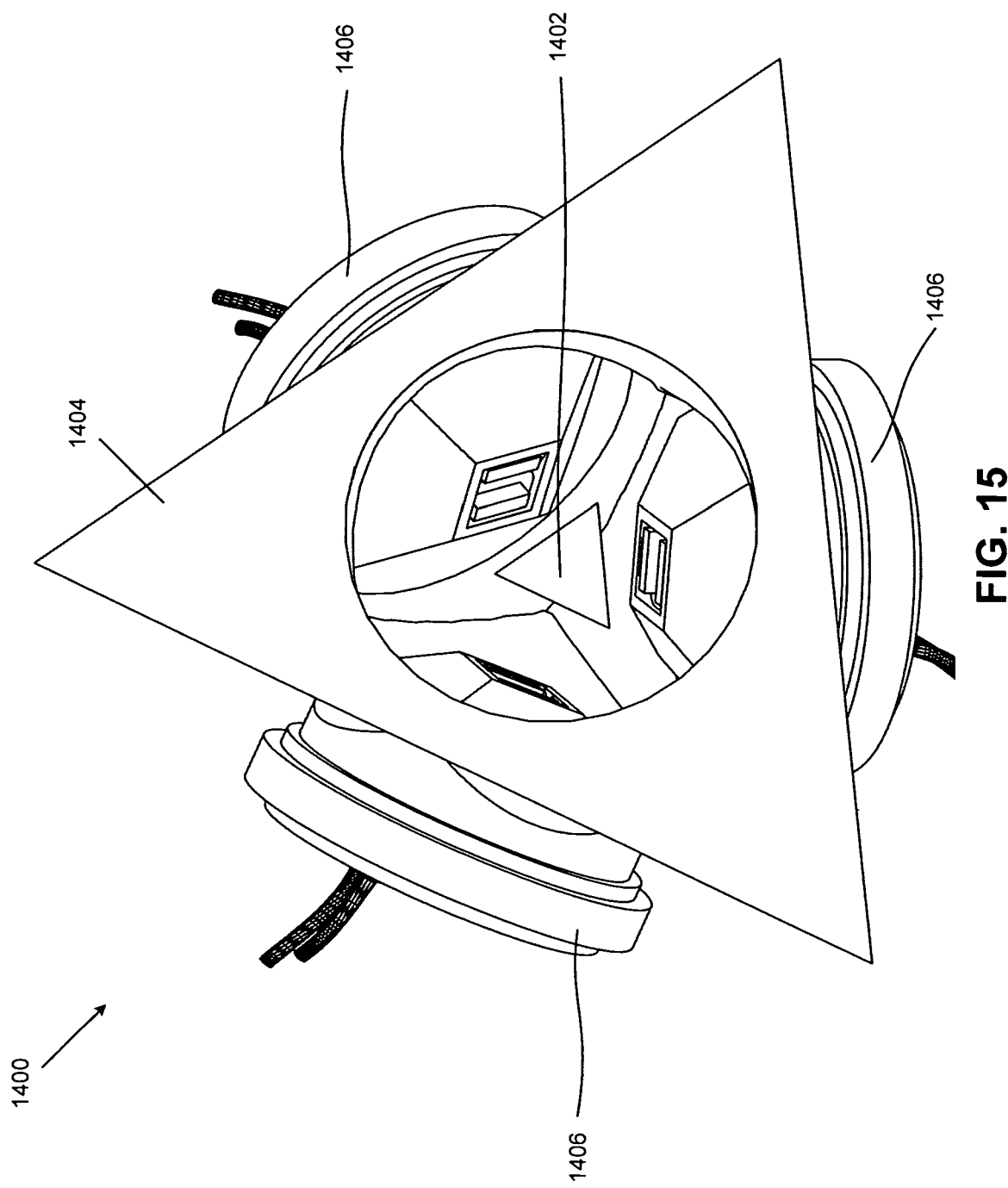
Figure 16:
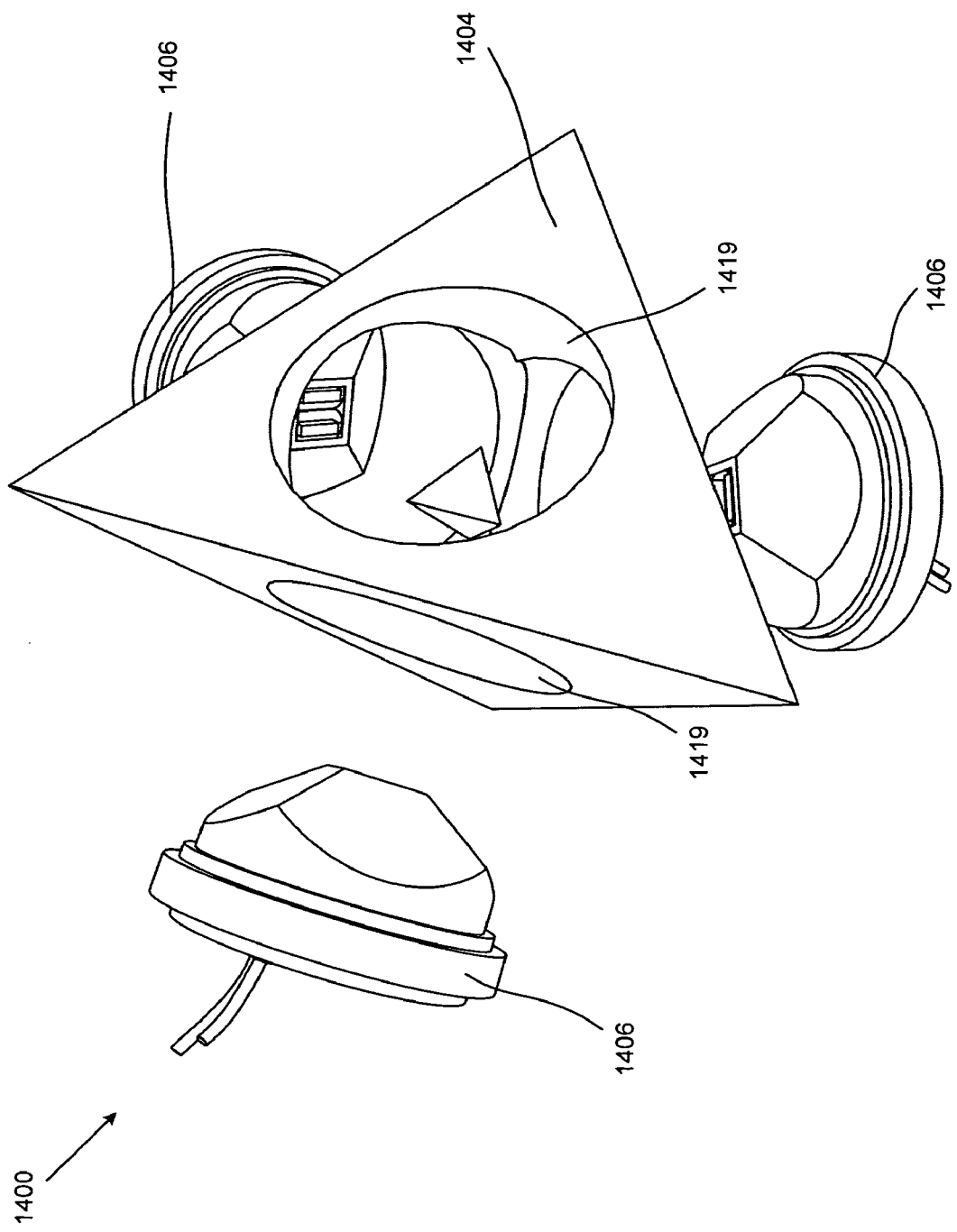

FIGS. 14–16 illustrate a sensor 1400 that includes a pyramidal-shaped housing 1404 that houses a pyramidal-shaped inertial body 1402 according to another embodiment of the present invention. Sensor 1400 includes four sides each having a drive magnet assembly 1406 that are functionally similar to drive magnet assemblies 106A–106F described above. As such, each drive magnet assembly 1406 is engaged and coupled with housing 1404 via a housing port 1419.

Accordingly, magnetofluidic acceleration sensors as described above work on the principle of repulsive magnetic forces. The magnetic fluid contained therein is highly magnetic, and is attracted to the drive magnets thereof. Therefore, the action of the magnetic fluid being pulled toward the drive magnets creates within the magnetic fluid a push-back, or repelling, effect against the inertial body in a direction away from the drive magnets. In the case where all the drive magnets are identical, or where all the drive magnets exert an identical force, and the drive magnets are arranged symmetrically about the inertial body, the inertial body will tend to be suspended in the geometric center of the housing. This effect may be described as a repulsive magnetic effect, even though the inertial body is not directly affected by the drive magnets, but rather indirectly through the magnetic fluid.

Having thus described embodiments of the invention, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A sensing element of an accelerometer comprising:
   a housing;
   a plurality of drive magnet assemblies positioned within the housing, wherein each drive magnet assembly includes a magnet and a sensing coil, and has a shape of a truncated pyramid with an apex facing into the housing;
   a magnetic fluid within the housing proximate to the drive magnet; and
   an inertial body within the magnetic fluid.

2. The sensing element of claim 1, wherein the housing further includes a first joining surface of a first housing portion being securable to a corresponding second joining surface of a second housing portion to form the housing.

3. The sensing element of claim 2, wherein the first and second joining surfaces are inclined relative to a horizontal axis.

4. The sensing element of claim 2, wherein each of the first and second housing portions includes a half of a working space for housing the inertial body and the magnetic fluid.

5. The sensing element of claim 2, wherein each of the first and second housing portions includes at least one drive magnet assembly.

6. A sensing element of a magnetofluidic acceleration sensor, the sensing element comprising:
   a housing having a plurality of ports that provide an opening from an exterior to an interior of the housing;
   a plurality of drive magnet assemblies, each drive magnet assembly having a shape of a truncated pyramid with an apex facing into the interior and engageable with a respective port of the housing, wherein each drive magnet assembly includes a magnetic field source; and a sensing coil
   a magnetic fluid within the housing; and
   an inertial body within the magnetic fluid.

7. The sensing element of claim 6, wherein each drive magnet assembly farther includes an assembly casing and a rear cap that fit together to substantially enclose the magnetic field source.

8. The sensing element of claim 7, wherein the magnetic field source includes a drive magnet coil and a pair of sensing coils.

9. The sensing element of claim 8, wherein the drive magnet coil and the pair of sensing coils are wound about a common transformer core.

10. The sensing element of claim 9, wherein the common transformer core is engageable with the rear cap of the drive magnet assembly.

11. The sensing element of claim 7, wherein each assembly casing has a plurality of inclined surfaces that extends within the interior of the housing.

12. The sensing element of claim 11, wherein the inclined surfaces of one drive magnet assembly align with the inclined surfaces of proximate drive magnet assemblies.

13. The sensing element of claim 7, wherein each assembly casing includes a leading surface such that the leading surfaces of the drive magnet assemblies form a working space within which the inertial body is contained.

14. The sensing element of claim 7, wherein each assembly casing includes a leading surface.

15. The sensing element of claim 14, wherein the sensing coil comprises a pair of sensing coils wound about a respective core portion, such that a leading surface of the core portions and a leading surface of the assembly casing are in a common plane.

16. The sensing element of claim 15, further comprising a hermetic seal used to seal the leading surfaces of the core portions and the assembly casing to prevent magnetic fluid from entering the assembly casing.

17. The sensing element of claim 6, wherein the housing has six sides, with each side having one of the plurality of drive magnet assemblies attached thereto.

18. The sensing element of claim 6, wherein the housing has six sides with fewer than all sides having one of the plurality of drive magnet assemblies attached thereto.

19. The sensing element of claim 18, wherein the housing includes contact pads on at least one side of the housing for engaging with a printed circuit board.

20. The sensing element of claim 6, wherein the magnetic field source is a drive magnet selected from a group consisting essentially of a magnet, an electromagnet and a combination of a magnet and an electromagnet.

21. The sensing element of claim 6, wherein the inertial body is non-magnetic.

* * * * *